(12) United States Patent
Lele et al.

(10) Patent No.: US 7,797,132 B1
(45) Date of Patent: Sep. 14, 2010

(54) BENCHMARKING AND TESTING GPS PERFORMANCE ON COMMUNICATION DEVICES

(75) Inventors: Kamlesh Lele, Reston, VA (US); Arsalan Sajid Mehmood, Arlington, VA (US); Robert Scott Oberlender, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 137 days.

(21) Appl. No.: 11/844,485

(22) Filed: Aug. 24, 2007

(51) Int. Cl.
    G06F 3/01 (2006.01)
(52) U.S. Cl. .............. 702/182; 702/181; 702/183; 702/188
(58) Field of Classification Search ........... 702/69, 702/89, 176, 178, 181, 182, 188; 340/436; 455/456.6; 701/207
    See application file for complete search history.

(56) References Cited

U.S. PATENT DOCUMENTS

| | | | |
|---|---|---|---|
| 5,093,800 A | | 3/1992 | Ifune |
| 5,555,503 A | * | 9/1996 | Kyrtsos et al. .............. 701/207 |
| 6,048,366 A | * | 4/2000 | Ellis et al. .................. 703/8 |
| 6,525,657 B1 | | 2/2003 | Wojcik |
| 6,657,214 B1 | | 12/2003 | Foegelle et al. |
| 6,662,008 B1 | | 12/2003 | Dolan et al. |
| 6,697,604 B1 | | 2/2004 | Rimpelae et al. |
| 6,714,779 B2 | | 3/2004 | Hall et al. |
| 6,760,582 B2 | | 7/2004 | Gaal |
| 6,766,164 B1 | | 7/2004 | Funk et al. |
| 6,778,823 B2 | | 8/2004 | Adam et al. |
| 6,898,272 B2 | | 5/2005 | Talalai |
| 6,901,265 B2 | * | 5/2005 | Pratt .................. 455/456.6 |
| 6,947,709 B2 | | 9/2005 | Kaindl |
| 6,975,959 B2 | | 12/2005 | Dietrich et al. |
| 7,024,187 B2 | | 4/2006 | Moles et al. |
| 7,136,587 B1 | | 11/2006 | Davis et al. |
| 7,136,746 B2 | | 11/2006 | Kang et al. |
| 2007/0236366 A1 | * | 10/2007 | Gur et al. .................. 340/945 |

OTHER PUBLICATIONS

Spirent Communications, "Spirent Testing Solutions for Global Navigation and Positioning", http://www.spirentcom.com/documents/4350.pdf, 2006, Spirent Communications, Inc.
"Spirent Leads Test and Measurement of Next-Generation Wireless Technologies", http://findarticles.com/p/articles/mi_m0EIN/is_2002_March_18/ai_83925342/print, CTIA Wireless 2002, Booth No. 410, Business Wire, Mar. 18, 2002.
Spirent Communications, "C2K-ATS PLTS for Location-Based Services Testing", http://www.spirentcom.com/documents/119.pdf, 2007 Spirent Communications, Inc.

* cited by examiner

*Primary Examiner*—Hal D Wachsman
*Assistant Examiner*—Felix E Suarez

(57) ABSTRACT

A method and system for providing repeatable GPS performance testing of a communication device are provided. Navigation data is complied over a drive route. The navigation data is used as an input to a GPS simulator to duplicate in a laboratory setting the GPS signals present at the GPS receiver during a travel along the drive route. Performance data of a baseline unit can be obtained for benchmarking the performance of a communication device being tested. A device under test can also be exposed to simulated GPS signals and to both simulated GPS signals and other radio frequency signals, such as telephone network signals present along the drive route.

19 Claims, 5 Drawing Sheets

BENCHMARKING AND TESTING GPS PERFORMANCE ON COMMUNICATION DEVICES

BACKGROUND OF THE INVENTION

Location based services (LBS) are now provided in various types of communication devices, such as cellular phones, personal digital assistant (PDA) type devices, and direction-assistance devices for vehicles. Devices with LBS features largely rely on the Global Positioning System (GPS) in which the communication device contains a GPS receiver system for receiving and processing the GPS satellite signals to determine the current location of the device. These devices also execute one or more LBS applications that rely upon the determined location.

SUMMARY OF THE INVENTION

In order to ensure reliability and accuracy of the LBS information, devices incorporating a LBS function are tested extensively using either test drives or simulations. The reliability and/or accuracy of the test drives can be affected by, for example, a weak signal reception, adverse interaction of radio frequency signals merging at a particular point, and/or an incompatibility of applications performing at a certain merger of in-use conditions. Furthermore, environmental conditions, such as buildings, terrain, and weather vary widely with the particular day, time of day and location, all of which affect the reliability and repeatability of the test device. Simulations typically use non-real world data as an input to the simulator, and using such data does not provide an accurate characterization of how a device operates under real-world conditions.

In accordance with the invention, a system and method are provided for testing GPS performance of a communication device comprising the acts of exposing a communication device in a test chamber to simulated GPS signals generated based on navigation data compiled over a drive route; obtaining communication device GPS performance data corresponding to a simulated movement of the communication device over the drive route; and comparing the communication device performance data to a baseline unit performance data measured for the same drive route.

Exemplary embodiments of the present invention can be used for benchmarking the performance of a device being tested against a baseline device and/or to test the performance of a device over the drive route. The testing can be performed to identify errors produced by the communication device, such errors being solely GPS-related errors, errors in location based system applications and/or errors that occur to other functions of the device.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE DRAWINGS

Figure 1:
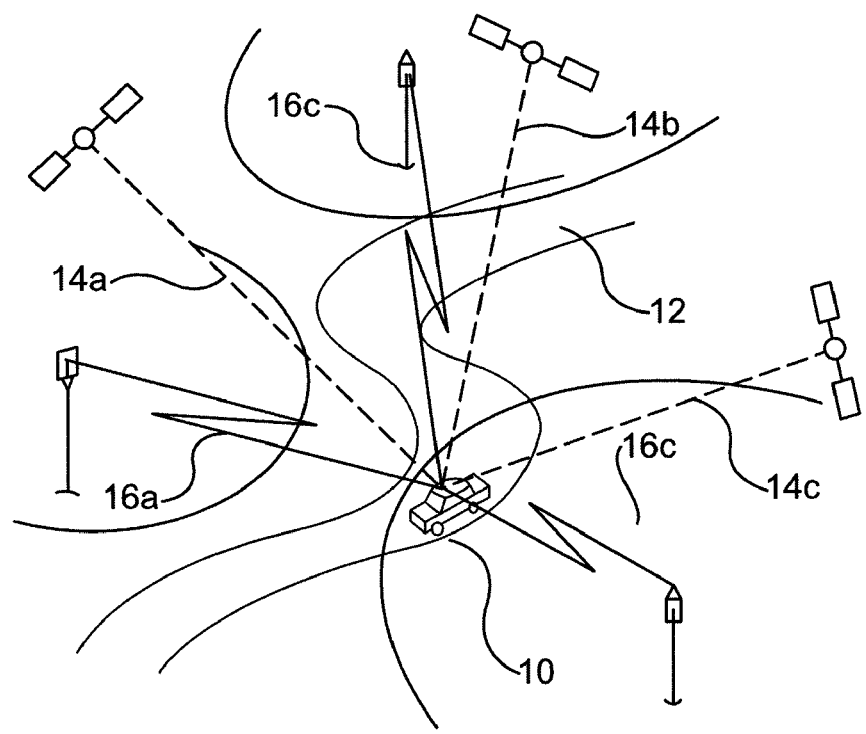
FIG. 1 illustrates a vehicle that receives network radio frequency (RF) signals and GPS signals while traveling over a drive route.

With the rapid growth of mobile wireless communications, a person traveling in a vehicle might be in communication through use of various types of radio frequency signals. FIG. 1 illustrates a vehicle 10 traveling along a drive route 12 while a device in the vehicle (not illustrated) receives GPS satellite signals 14a-c and while communicating with a mobile network provider, using mobile network signals 16a-c.

An exemplary system in accordance with the invention provides a way for providing a standardized and repeatable test procedure for a GPS receiver in a communication device, without having to actually drive along the same drive route for each test, while providing a test method and system that provides laboratory test repeatability of the same drive route test conditions for the testing, or benchmark and testing, of a GPS receiver in a communication device.

Figure 2:
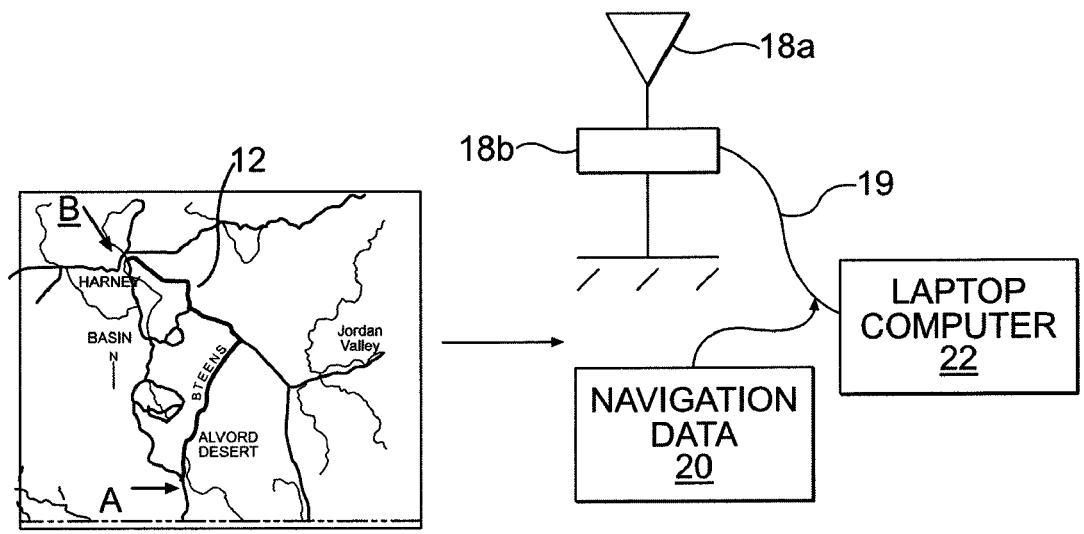
FIG. 2 is a diagram of a drive route between end points A and B with navigation data compiled while traveling over that drive route.

As illustrated in FIG. 2, a drive route 12 between end points A and B is first traveled to conduct a remote data collection by which navigation data is compiled for that drive route. GPS signals are received by a GPS receiver 18b via vehicle mounted GPS antenna 18a. GPS receiver 18b can be connected by a cable 19 to a laptop computer 22. Data is compiled from the received GPS signals while traveling over drive route 12 and is recorded as navigation data 20. The data could be in digital format, and could be recorded on a storage medium in a data storage unit, such as a laptop computer 22, and can be compatible with the National Electronics Maritime Association (NEMA) Standard. Stored navigation data 20 can be used to give constant drive route test conditions for repeatable testing in a laboratory environment. Specifically, two different devices can be tested under the same real-world conditions. Furthermore, the exact time of a device error can be identified, and then repeated with various modifications to the device in order to ensure that the error is corrected.

Figure 3:
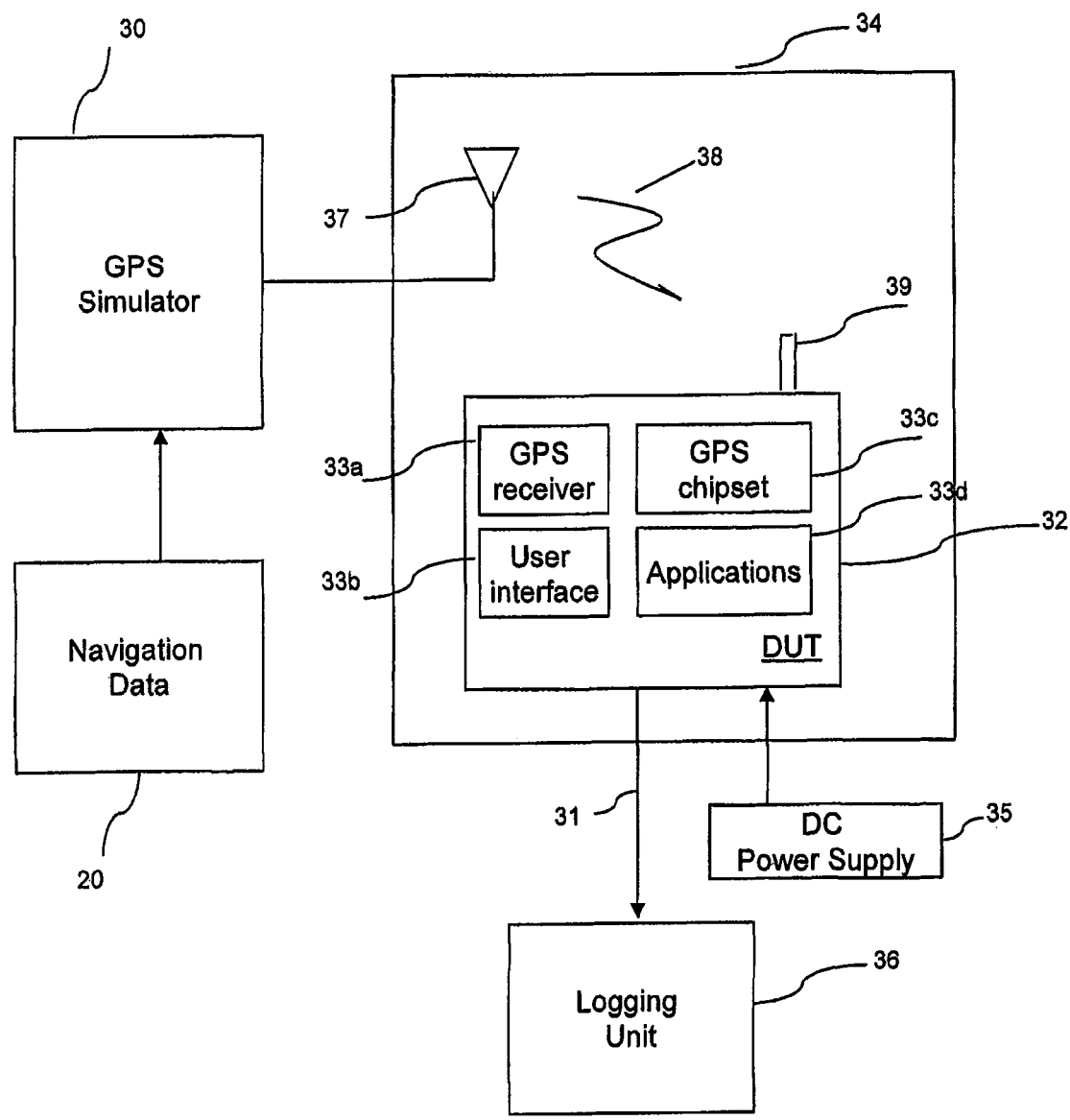
FIG. 3 is a block diagram of a test setup for repeatable testing of a GPS receiver system in a communication device using simulated GPS signals created based on inputted navigation data.

FIG. 3 is a block diagram of a test setup for repeatable testing of a GPS receiver system in a communication device under simulated GPS signals based on inputted navigation data. The communication device, being device under test (DUT) 32 in FIG. 3, could be one that provides one-way or two-way communication, and it could be a mobile communication device such as a mobile cellular telephone. The recorded navigation data 20 is input to a GPS simulator 30. This input could be done directly from the storage unit, such as laptop computer 22 (FIG. 2), or could be transferred using storage media, such as compact disks (CD) and the like. GPS simulator 30 includes GPS simulation software that translates the navigation data 20 into a test scenario under laboratory conditions, such that GPS simulator 30 produces simulated GPS signals of the satellite constellation that makes up the Global Positioning System. GPS simulators are available from various manufacturers, one of whom is Spirent Communications, Inc. in West Sussex, United Kingdom.

DUT 32 contains a GPS chipset 33c operatively coupled to GPS receiver 33a. Applications 33d could be one or more LBS applications, such as JAVA-based applications that access the GPS chipset, or independent applications that reside on the mobile device and are accessible through the User Interface (UI). A user interface 33b can be used to activate functional capabilities of the DUT. DUT 32 is placed inside a test chamber 34, and can be placed in a holster to maintain a desirable upright position inside the test chamber. Test chamber 34 isolates the test setup from external noise and interference, and is in the form of an electrically shielded box. A GPS signal antenna 37 from GPS simulator 30 is also placed inside the test chamber 34. Simulated GPS signals 38 from GPS simulator 30 are provided to test chamber 34 using electronically isolated RF adaptors feeding the GPS antenna inside the chamber. A DC power supply 35 is connected to the DUT from outside the test chamber to provide for connection of an external DC power supply to the DUT. Although not illustrated, logging unit 36 can include a visual display and/or have the ability to record the performance data, such as on a print out or stored on a memory medium. Although logging unit 36 is shown outside of the test chamber and connected via a cable 31 to the DUT inside the test chamber, logging unit 36 could alternatively be placed inside the test chamber.

Signal levels on the GPS simulator are adjusted initially to confirm that the GPS receiver of the DUT is observing signal levels within the GPS receiver's recommended limits. Simulated GPS signals 38, that are generated using the stored navigation data 20, are radiated within test chamber 34 and are received by a GPS receiver antenna 39 on the DUT 32. An output of the DUT is connected through the test chamber to a logging unit 36 to record the performance of the DUT while it is exposed to simulated GPS signals.

Because the GPS signals are generated based on the navigation data 20 inputted to GPS simulator 30, the present invention is able to re-create actual GPS signals received over the drive route. Accordingly, various test scenarios can be conducted based on real-world environmental conditions as they impact LBS and GPS performance. Thus, a repeatable simulated movement is provided to GPS receiver 33a of DUT 32 along the drive route 12. Therefore, if a failure should occur at some point during the test, the location along the drive route can be determined and the conditions, which may be environmental conditions or RF conditions, or a combination of the two, existing at that location can be further analyzed in determining the cause of the failure. The test is also repeatable on the same communication device in the convenience of a laboratory setting, which is especially helpful in the trouble-shooting process. For example, the communication device can be modified in an attempt to correct the error, and the testing repeated in such a way that the particular signals that caused the error can be reproduced, and the modified communication device's performance can be evaluated to determine if the modifications correct the error.

These various tests that can be performed on the DUT 32 include operability of the LBS applications, call processing stress testing, mobility management (i.e., call handoff) stress testing and feature stress testing (such as Bluetooth, Call Waiting, Speaker, etc). The DUT is navigated via the simulated GPS signals to the same points traveled by the remote data collection vehicle, and any difference in performance is noted. The same test is then repeated on a baseline unit (BLU). A baseline unit, as used herein, is a device used as a reference and against which other communication devices can be compared.

Several types of data collection can be employed during the test. One technique is to collect audio and visual data during the testing by placing a digital camcorder inside the test chamber. The camera captures audio and visual performance data provided by the communication device concerning the location based service, hardware and/or software application performance. The audio and/or visual performance data obtained for the DUT and the BLU can then be compared and any differences, such as delays or missed navigation points, can be tallied.

Acceptance criteria can be established and applied to ensure that there be no significant differences in performance in the audio and visual comparisons of the DUT and BLU. For example, a variation of no more than 5% might be considered for use as a test standard.

Figure 4:
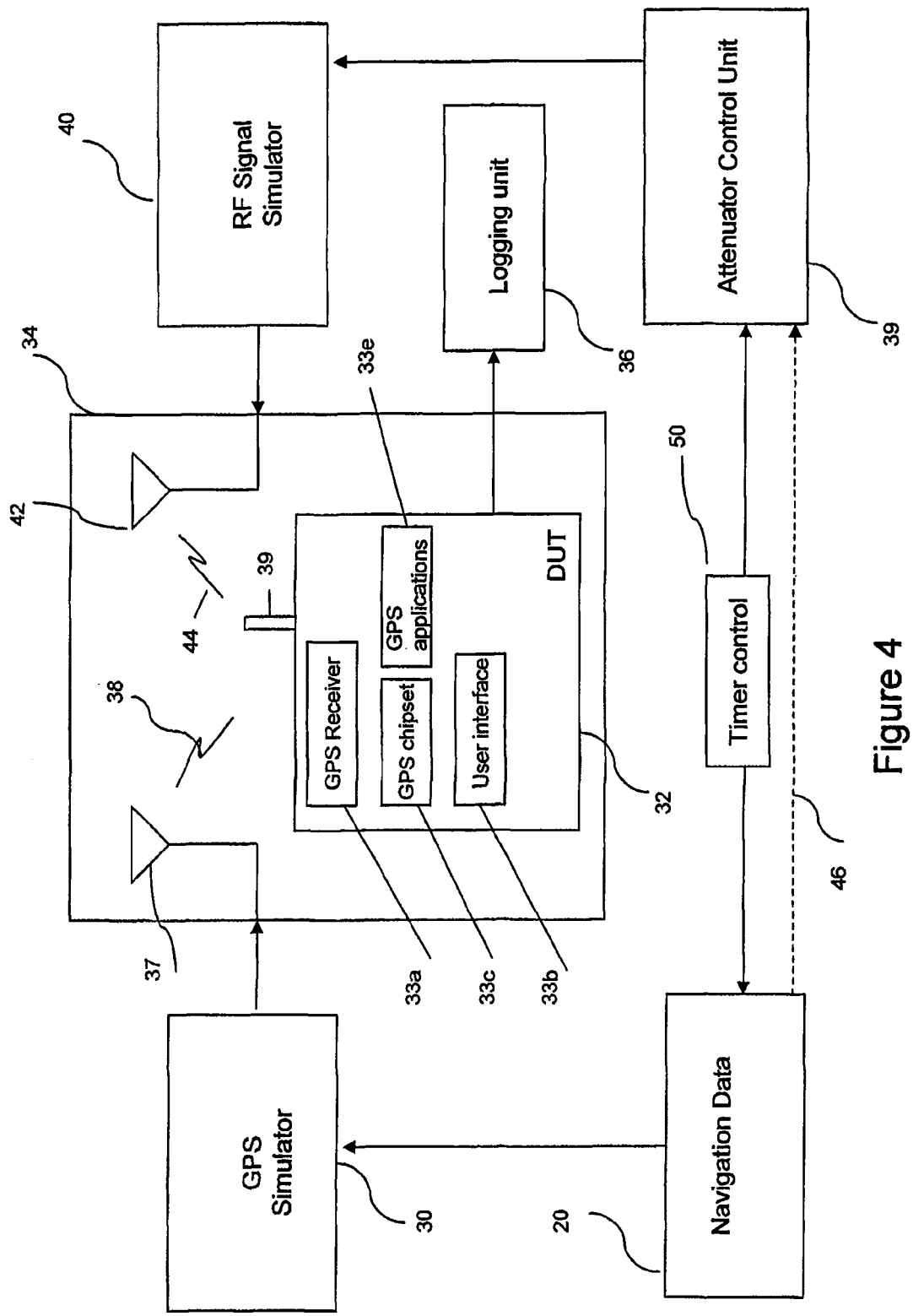
FIG. 4 is a block diagram of a test setup for repeatable testing of a GPS receiver system in a communication device using simulated GPS signals and simulated RF signals.

Referring next to FIG. 4, another exemplary embodiment is presented where the system and method of the invention can be applied in the presence of other radio frequency (RF) signals in addition to the GPS signals, so to duplicate actual conditions where there are multiple signals, GPS and RF, occupying the same space. In FIG. 4, like components as appear in FIG. 3 are arranged and function as previously described. An external DC Power Supply 35 (not shown in FIG. 4) can be connected to DUT 32 In addition, the test setup of FIG. 4 has a RF Signal Simulator 40 having a signal output that connects to a RF signal antenna 42 inside test chamber 34 that radiates a radiated simulated RF signal 44. An Attenuator Control Unit 39 is connected to RF Signal Simulator 40 to provide any simulated RF signal attenuation that might be desired throughout the testing process. The RF signal simulator 40 provides whatever other radio frequency signals that might be present along the drive route and might be used to provide electromagnetic compatibility testing of the DUT for particular conditions. RF signal simulator 40 could simulate a data signal or a continuous wave signal. For example, it could be used to duplicate a periodic radar signal, or aviation control signals that might be in the vicinity, and GPS testing is conducted in the environment of these competing RF signals.

A timer control 50 is connected between navigation data 20 and attenuator control unit 39 to coordinate the timing of the two signals being radiated in test chamber 34. Timer control 50 allows for making suitable adjustments as needed for any time difference that might occur to maintain precision in the testing process. An additional option, indicated by dashed line 46, is to connect navigation data 20 also as an input to Attenuator Control Unit 39. Accordingly, navigation data 20 is also used to control RF signal simulator 40 by feeding its attenuator control unit 39 with navigation data in the situation where the navigation data might affect the RF signal appearing along the drive route.

Figure 5:
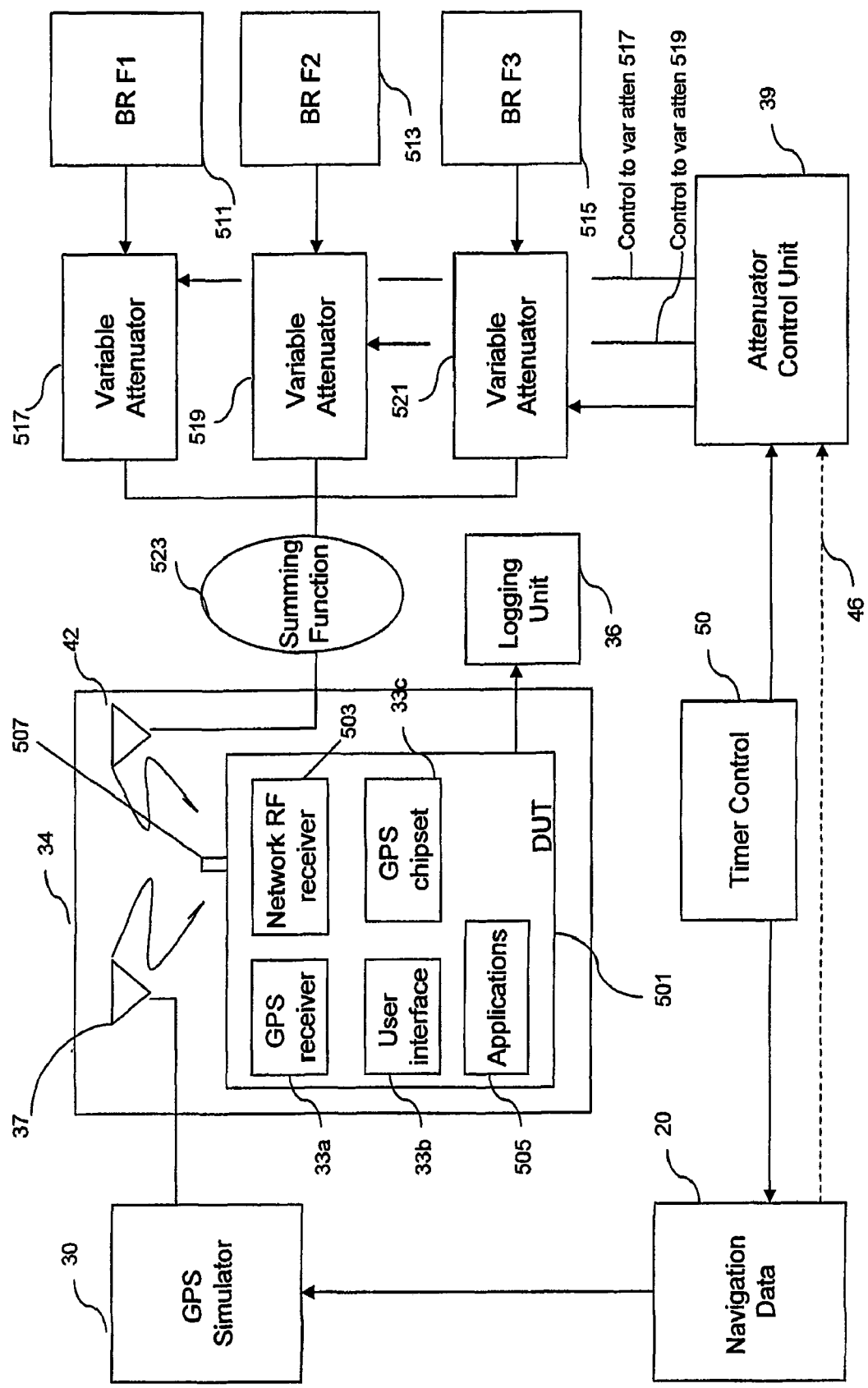
FIG. 5 is a block diagram of a test setup for repeatable testing of a GPS receiver system in a communication device using simulated GPS signals and simulated data signals of a mobile telephone network.

FIG. 5 is a block diagram of a test setup for repeatable testing of a communication device under simulated GPS signals and where the simulated data signals are signals of a mobile telephone network. In FIG. 5, like components as appear in FIGS. 3 and 4 have like numerals and are arranged and function as previously described. In the embodiment of FIG. 5, the device under test is a communication device 501 that provides two-way communication, and could be a mobile communication device such as a cellular telephone. An external DC Power Supply 35 (not shown in FIG. 5) can be connected to DUT 32 In addition to the DUT components previously discussed, communication device 501 contains a RF network receiver 503, and applications 505 that may contain both GPS applications and network applications. Communication device 501 also has antenna 507 for transmitting and receiving RF signals which in the embodiment of FIG. 5 are cellular network telephone signals. For simplicity, antenna 507 is shown in FIG. 5 as a single antenna for both GPS and network simulated signals. However, there can be two antennas that may be within a single housing or be contained within, or project from, communication device 501 as separate antennas, one being a GPS antenna and the other being the network antenna on communication device 501.

The simulated network signals are provided by three base station signal simulators, 511, 513 and 515. Each base station simulator is connected so that its output signal is input to a variable attenuator, 517, 519 and 521, respectively, each of which is controlled by an Attenuator Control Unit 39. The variably attenuated, simulated base station signals output by variable attenuators 517, 519 and 521 are summed by Summing Function 523, and the summed simulated network signal is output to RF signal antenna 42 located within test chamber 34. During testing, communication device 501 is exposed to simulated GPS signals controlled by inputted navigation data 20 and radiated from GPS signal antenna 37, and to simulated network signals radiated from RF signal antenna 42. Attenuator Control Unit 39 provides control of the network signals as desired by the test being conducted. Although FIG. 5 shows a simulation of three base station signals making up the network signal, it is understood that only one, or any number of base station simulated signals can be used.

As an alternative arrangement in the test setup of FIG. 5, Attenuator Control Unit 39 and Navigation Data 20 can be interconnected via a timer control, such as Timer Control 50 in the arrangement as previously presented in FIG. 4. This arrangement has both the GPS signal simulation and the network signal simulation being controlled by the navigation data so to simulate a movement of the communication device 501 along the travel route over which navigation data 20 was compiled. With this alternative arrangement, use of the recorded navigation data 20 in the test setup provides a standardized test condition in that both the GPS signal and the network signal are generated based on the navigation data, making the test condition repeatable for other mobile devices under the same simulated test condition.

To benchmark a communication device's GPS performance, performance data on a baseline unit (BLU) is first obtained by using the navigation data with any one of the test setups and procedures discussed, or by obtaining the BLU performance data from field testing over the drive route. To obtain the BLU performance data from field testing over the drive route, a BLU is field tested by traveling along the data route 12 (FIG. 1), compiling the navigation data 20 while also measuring performance data of the communication device along the route. This then becomes the BLU performance data. The conditions under which this performance data was produced are recorded in the form of the navigation data. Then in a test laboratory, the simulated GPS signals are generated according to the navigation data and they, therefore, duplicate the characteristics of the GPS signals actually received at the GPS receiver as it traveled along the drive route. Performance data of other communication devices can then be obtained from the test systems and procedures described herein and benchmarked against the BLU's performance data.

An alternative way of establishing the BLU performance data is to use a BLU in the lab test chamber 34 with the navigation data controlling the generation of the simulated GPS signals to match those present along the drive route. Recording its performance data under test conditions according to the invention provides a BLU performance data for GPS testing, against which the performance data of other communication devices can be compared and benchmarked.

Although the description above includes a comparison of a baseline unit's performance data against a DUT, the present invention can also be used for testing communication devices for errors, without benchmarking, i.e., without comparing the performance of the DUT to a BLU. For example, communication devices can be tested under repeatable conditions, for example, for the absence of any failure along the defined drive route, without regard to how it quantitatively measures against a benchmark.

Figure 6:
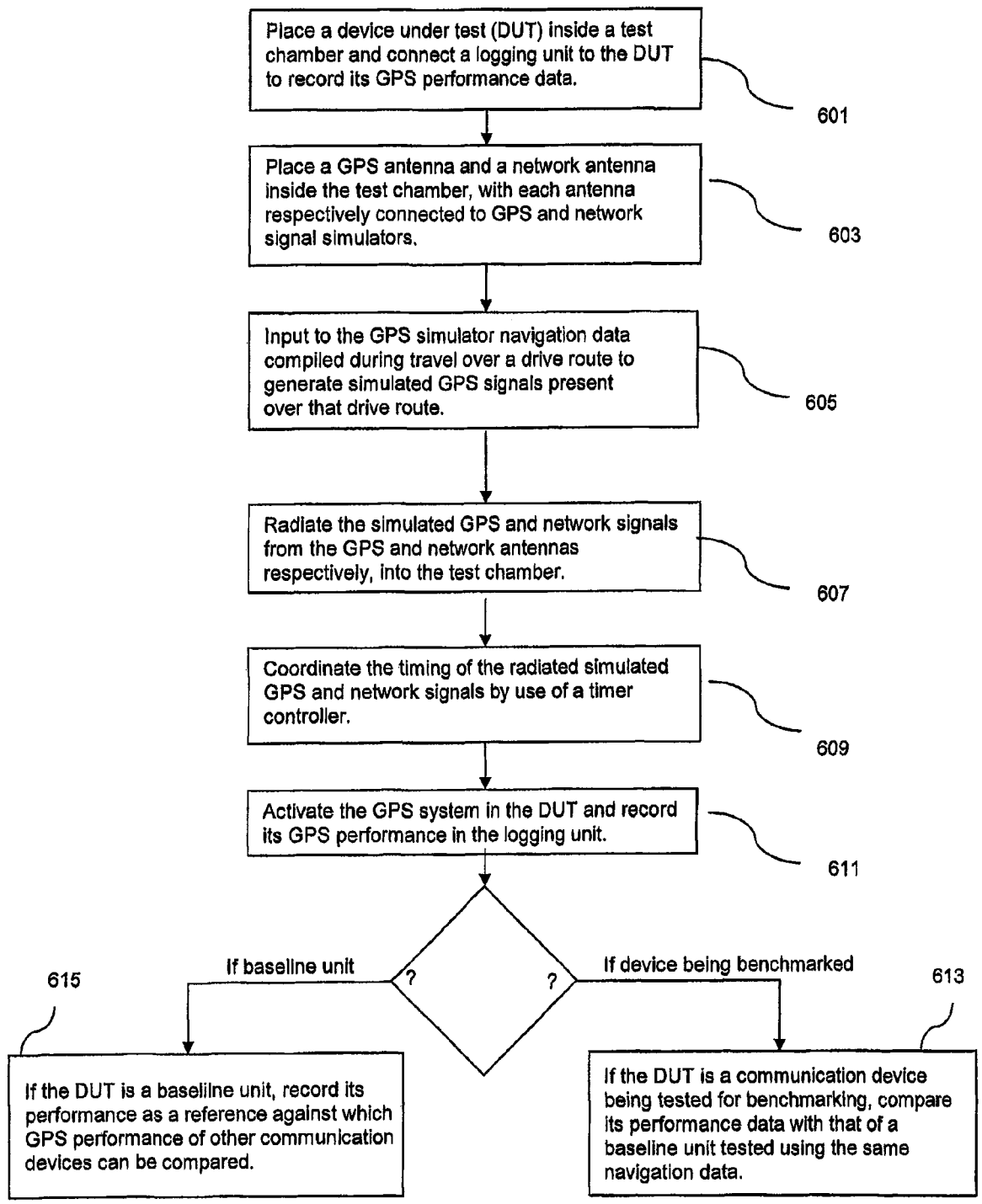
FIG. 6 is a flow chart of an exemplary method for benchmarking and testing in accordance with the present invention.

FIG. 6 is a flow chart that shows steps in the testing and benchmarking of a communication device in accordance with an exemplary embodiment of the invention. The steps of the flow chart of FIG. 6 present steps both for establishing a baseline unit's performance data, and for benchmarking a communication device being tested.

A device under test (DUT) is first placed inside a test chamber and is connected to a logging unit to record its GPS performance data (step 601). A GPS antenna and a network antenna are placed inside the test chamber, with each antenna respectively connected to GPS and network signal simulators (step 603). Navigation data compiled during travel over a drive route is then input to the GPS simulator to generate simulated GPS signals present over that drive route (step 605).

The simulated GPS and network signals are radiated from the GPS and network antennas into the test chamber (step 607). A timer control is used to coordinate the timing of the radiated simulated GPS and network signals (step 609). The GPS system in the DUT is activated and its GPS performance data is recorded and/or visually presented in the logging unit (step 611).

If the DUT is a baseline unit, its performance is recorded as a reference against which GPS performance of other communication devices can be compared (step 615). On the other hand, if the DUT is a communication device being tested for benchmarking, its performance data is compared with that of a baseline unit tested using the same navigation data (step 613).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for testing GPS performance of a communication device comprising the acts of:
    exposing a communication device in a test chamber to simulated GPS satellite signals generated using navigation data compiled from GPS satellite signals received over a drive route;
    obtaining communication device GPS performance data generated by the communication device, the performance data corresponding to a simulated movement of the communication device over the drive route in response to the exposing; and
    comparing the communication device performance data to a baseline unit performance data measured for the same drive route.

2. The method of claim 1, wherein said baseline unit performance data is produced by one of:
    compiling performance data on a baseline unit while traveling over the drive route; and
    compiling performance data on a baseline unit while exposed to a simulated varying GPS satellite signal generated using said navigation data for the drive route.

3. The method of claim 1, wherein the act of obtaining performance data comprises recording responses of a location based system application within the communication device to the simulated GPS satellite signals.

4. The method of claim 1, wherein the act of obtaining performance data comprises capturing visual responses of the communication device to the simulated GPS satellite signals.

5. The method of claim 1, further comprising the act of:
generating said navigation data from GPS satellite signal data received while traveling over the drive route.

6. The method of claim 1, wherein said drive route data comprises a computer readable code.

7. The method of claim 1, wherein the communication device is also exposed to simulated mobile telephone network signals.

8. The method of claim 1, further comprising the act of:
invoking at least one function of the communication device while the communication device is exposed to the simulated GPS signals.

9. The method of claim 8, wherein the at least one function is call processing, call handoff, or a call feature.

10. The method of claim 8, further comprising the acts of:
identifying a point in the drive route in which an error is produced by the communication device; and
repeating the exposing, and obtaining acts with a modified communication device.

11. The method of claim 10, wherein the modified communication device includes a modification to a location based services application.

12. A method for benchmarking and testing of GPS performance comprising the acts of:
collecting navigation data while traveling over a drive route;
inputting the navigation data to a GPS simulator to generate varying simulated GPS satellite signals corresponding to a travel over the drive route;
exposing a communication device under test conditions to the simulated GPS satellite signals to obtain performance data;
measuring a performance baseline unit's location based system application to obtain baseline unit performance data by one of measuring performance of the baseline unit while traveling over the drive route; and
exposing the baseline unit in a test chamber to simulated GPS satellite signals generated from the navigation data collected while traveling over the drive route; and
comparing said performance data to a baseline unit performance data for establishing a benchmark GPS performance of the communication device.

13. A system for benchmarking and testing of a communication device comprising:
a GPS receiver, mounted on a vehicle traveling over a drive route, that compiles navigation data as the vehicle travels over the drive route, wherein drive route data defines the drive route traveled between two end points;
a data storage unit coupled to said GPS receiver that stores said navigation data;
a GPS simulator having an input port receives said navigation data from the data storage unit;
a test chamber that encloses the communication device during a testing process, and that receives inside the test chamber an output signal from the GPS simulator, wherein said output signal comprises a varying GPS satellite signal generated as a function of the drive route data inputted to said GPS simulator; and
a logging unit for recording performance data of the communication device when exposed to said varying GPS signal in the test chamber.

14. The system of claim 13, wherein the navigation data comprises data corresponding to varying GPS satellite signals at the GPS receiver while traveling over the drive route and location data identifying the drive route.

15. The system of claim 13, further comprising:
a recorder for recording GPS performance data of a baseline communication device as the baseline communication device travels over the drive route to establish baseline performance data, wherein the recorder is adapted to record GPS performance data of the baseline communication device obtained by one of actual travel over the drive route and simulated travel over the drive route by use of simulated GPS satellite signals that correspond to the travel over the drive route.

16. The system of claim 13, wherein said performance data is compared to benchmark data to produce a test result of a GPS receiver in said communication device.

17. The system of claim 13, further comprising:
a radio frequency signal simulator outside the test chamber, coupled to a radio frequency antenna inside the test chamber, that outputs a simulated radio frequency signal concurrent with the output signal from the GPS simulator.

18. The system of claim 17, further comprising:
an attenuator control unit connected to the radio frequency signal simulator.

19. The system of claim 18, further comprising:
a timer control connected between the attenuation control unit and the data storage unit, wherein the timer control unit synchronizes output of the navigation data from the data storage unit with the simulated radio frequency signals.

\* \* \* \* \*